Patented July 20, 1954

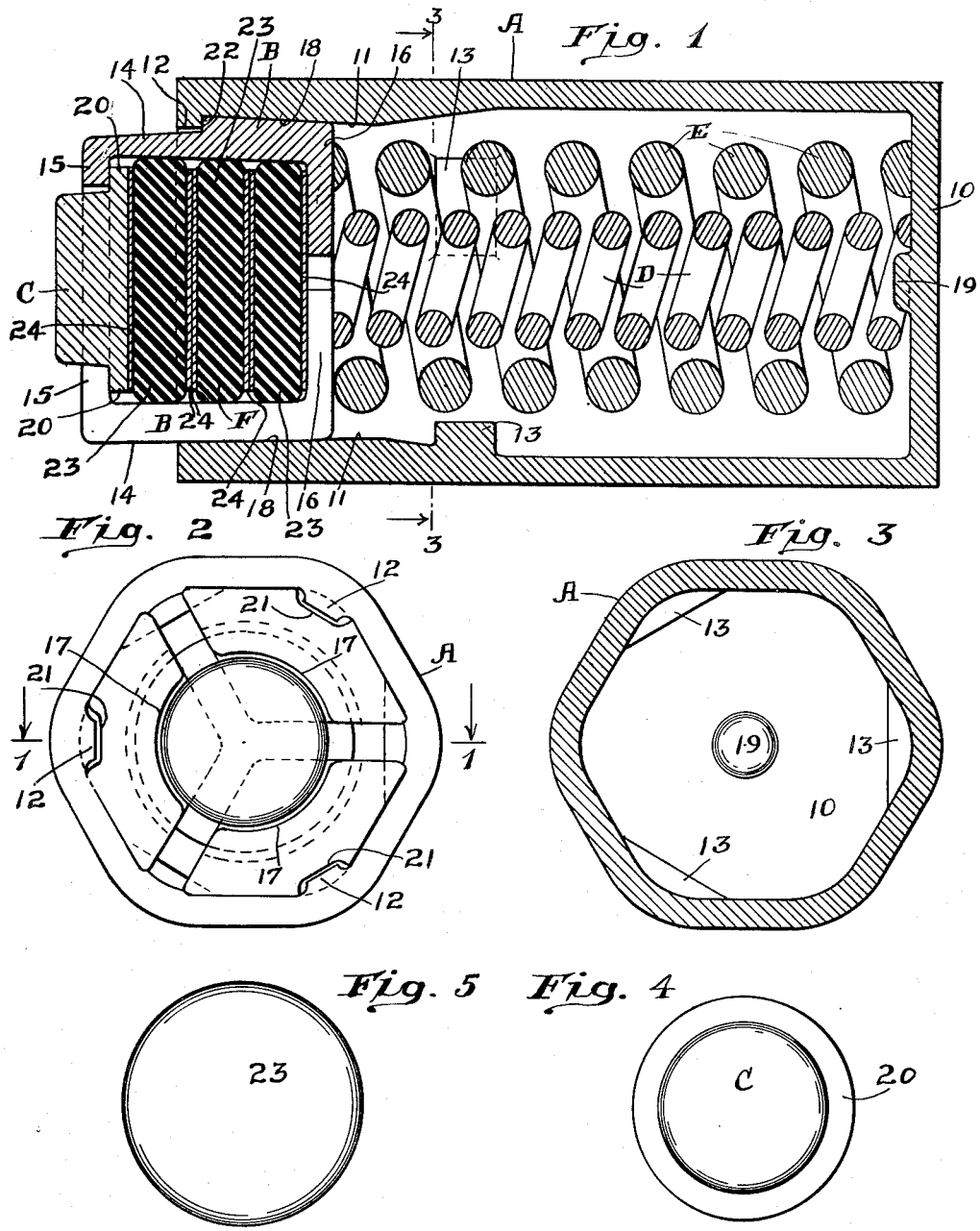

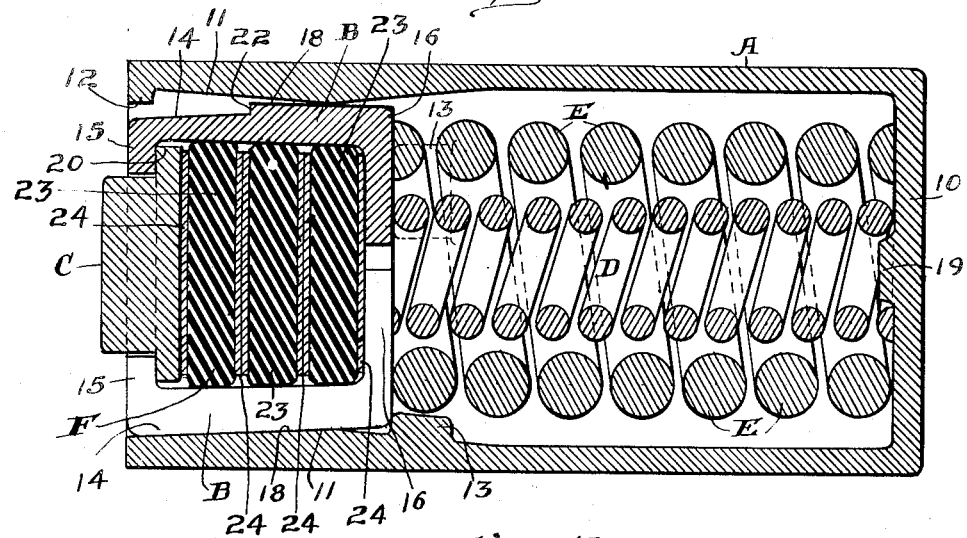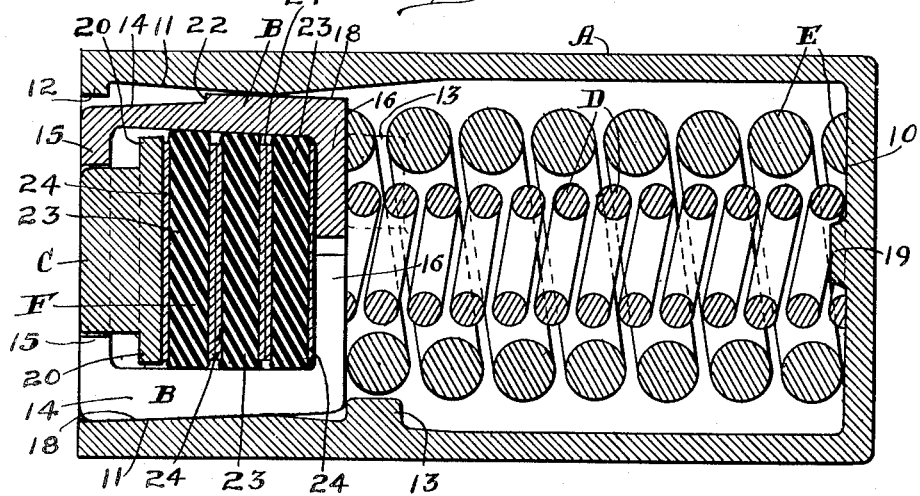

2,684,160

UNITED STATES PATENT OFFICE 2,684,160

COMBINED RUBBER AND FRICTION SHOCK ABSORBING MECHANISM FOR RAILWAY CARS

Arnold E. Dentler, Western Springs, Ill., assignor to W. H. Miner, Inc., Chicago, Ill., a corporation of Delaware Application February 24, 1953, Serial No. 338,446

19 Claims. (Cl. 213—32)

1

This invention relates to improvements in combined rubber and friction shock absorbing mechanisms for railway cars.

One object of the invention is to provide a friction shock absorbing mechanism for draft riggings of railway cars, comprising relatively lengthwise slidable friction elements, resilient means opposing relative lengthwise movement of said elements, yielding means under initial compression for forcing the friction elements into tight frictional engagement with each other, a pressure transmitting member movable in direction lengthwise of the mechanism and engaging the yielding means to exert pressure thereon and force the same to move in direction lengthwise of the mechanism, abutment means on one of said relatively movable elements with which the yielding means is engaged to effect relative movement of said elements, and cooperating stop means on said elements for arresting relative movement of the same.

Another object of the invention is to provide a shock absorbing mechanism comprising a friction element in the form of a casing having interior friction surfaces, a plurality of friction shoes telescoped within the casing in sliding frictional engagement with the interior surfaces thereof, a spring within the casing yieldingly opposing movement of the shoes inwardly of the same, a rubber element, interposed between the shoes, pressing the shoes against the casing friction surfaces, and a pressure transmitting member or plunger movable inwardly of the casing and engaging the rubber element to force the same inwardly, wherein the shoes are provided with abutment means engaged by said rubber element to communicate the longitudinal movement of said element to the shoes and carry the same inwardly of the casing, along the friction surfaces thereof.

A more specific object of the invention is to provide, in a mechanism as set forth in the preceding paragraph, cooperating stop means on the casing and shoes for arresting movement of the shoes inwardly of the casing, before full compression of the mechanism, whereby the rubber cushioning element is compressed against the abutment means of the shoes without further inward movment of the latter and further compression of the spring means during the remainder of the compression stroke, thus providing only rubber cushioning action during this last named stage of the operation of the mechanism.

A still further object of the invention is to provide a mechanism as hereinbefore set forth,

2 wherein the rubber element of the same is placed under initial compression, which may be relatively light, that is, such that the rubber element and the spring are compressed simultaneously, or much heavier, so that the rubber element acts as a solid column to transmit the pressure to the spring of the mechanism until the shoes are arrested in their movement by the stop means on the casing, thereby forcing the rubber element to take the load and be forcibly compressed.

Other objects of the invention will more clearly appear from the description and claims hereinafter following.

In the accompanying drawings forming a part of this specification,

Figure 1 is a horizontal, longitudinal sectional view of my improved shock absorbing mechanism, corresponding substantially to the line 1—1 of Figure 2.

Figure 2 is a front elevational view of Figure 1, looking from left to right in said figure.

Figure 3 is a transverse sectional view, corresponding substantially to the line 3—3 of Figure 1, with the springs omitted.

Figure 4 is an end elevational view of the pressure transmitting member or plunger shown in Figure 1, looking from left to right in said figure.

Figure 5 is a rear elevational view of the pressure transmitting member or plunger, looking from right to left in Figure 1.

Figures 6 and 7 are views similar to Figure 1, illustrating two successive stages of the compression of the mechanism.

As illustrated in the drawings, my improved shock absorbing mechanism comprises broadly a friction casing A, three friction shoes B—B—B, a pressure transmitting plunger C, inner and outer springs D and E yieldingly opposing inward movement of the shoes, and a rubber cushioning element F between the shoes.

The casing A is in the form of a tubular member of hexagonal transverse cross section. This casing is open at its front end and is closed by a transverse wall 10 at the rear end. At the open end thereof, the walls of the casing A are provided with inwardly converging friction surfaces 11—11—11 of V-shaped transverse cross section, the laterally converging portions of each V-shaped surface being formed on two adjacent walls of the hexagonal casing. The open front end of the casing A is further provided with three inturned stop lugs 12—12—12, which are at alternate corners of the casing, that is, at the corners between the laterally converging portions of the friction surfaces. Rearwardly of the friction surfaces 11—11—11 thereof, the casing is provided with three interior stop shoulders 13—13—13 formed by riblike webs which extend transversely across the corners of the casing from one friction surface to the other, and cooperate with adjacent shoes to limit inward movement of the same.

The three shoes B—B—B are of similar design, each shoe comprising a platelike section 14 of V-shaped, transverse cross section, having inwardly projecting, right angular flanges 15 and 16 at the front and rear ends, the rear flange 16 being of considerably greater depth than the front flange 15, and forming in effect an abutment wall. As shown, the flanges 16—16—16 of the shoes have their side edges converging inwardly toward the central longitudinal axis of the mechanism and are thus of substantially triangular outline. The flanges 15—15—15, which as shown are relatively shallow, have their inner edges curved, as indicated at 17—17—17, to provide a circular opening therebetween of relatively large size to accommodate the plunger C. On its outer side, each shoe presents a lengthwise extending friction surface 18 of V-shaped, transverse section, engaged with one of the V-shaped friction surfaces 11 of the casing A.

The inner and outer springs D and E are disposed within the casing A in back of the shoes B—B—B, each spring being in the form of a helical coil having its front and rear ends bearing respectively on the flanges 16—16—16 at the inner ends of the shoes, and the inner side of the wall 10 of the casing. The wall 10 is preferably provided with an inwardly projecting, central lug 19, which is engaged within the rear end of the inner spring D to center the latter.

The pressure transmitting plunger C is in the form of a cylindrical block having an outwardly projecting, annular flange 20 at its rear end. The flange is slidable between the shoes B—B—B and has the plunger 20 thereof engaged in back of the flanges 15—15—15 of the shoes to limit outward movement of the plunger with respect to said shoes. Outward movement of the shoes B—B—B with respect to the casing A is limited by the stop lugs 12—12—12 of the casing, each shoe being slotted lengthwise on its outer side, as indicated at 21, to slidingly accommodate the corresponding lug 12, and presenting a transverse shoulder 22 at the rear end of the slot over which the lug 12 engages. As shown in Figure 1, the plunger C projects outwardly beyond the front ends of the shoes B—B—B to receive the actuating force. The inner end of the plunger C engages with and bears on the rubber cushioning element F.

The rubber cushioning element F comprises a plurality of units, preferably three, as shown, each composed of a rubber pad 23 of circular shape, and two metal discs 24—24 of smaller diameter than the pad, said discs forming spacing plates. The pad of each unit is embraced by the discs 24—24 to which it is attached by being vulcanized thereto. The three units composing the rubber cushioning element F are arranged in series between the shoes B—B—B with the disc 24 at the front end of the front unit bearing on the inner end of the plunger C and with the rear disc 24 of the rear unit bearing on the rear flanges 16—16—16 of the shoes B—B—B. The rubber pads 23—23—23 of the cushioning element F are of such a size in diameter as to closely fit against the inner sides of the shoes B—B—B, and in the assembled condition of the mechanism are preferably under initial compression between the plunger C and the rear flanges 16—16—16 of the shoes so as to exert pressure in radial direction on the shoes to force the latter against the friction surfaces 11—11—11 of the casing.

The operation of my improved shock absorbing mechanism is as follows: Upon compression of the mechanism between the usual front and rear followers, not shown, of a railway draft rigging, the plunger C is forced inwardly toward the casing A, and the force thus exerted on the rubber cushioning element F, which bears on the flanges 16—16—16 of the shoes B—B—B, carries the shoes rearwardly or inwardly of the casing along the friction surfaces 11—11—11, opposed by the springs 15 and 16, compressing the latter. High frictional resistance is thus provided by the engaging friction surfaces of the shoes and casing. In the mechanism as illustrated in Figures 6 and 7, the initial compression of the rubber cushioning element F is gaged so that there will be no appreciable increase in compression of the same between the plunger C and the rear flanges of the shoes B—B—B as the latter move inwardly of the casing, and until the same are arrested in their relative movement with respect to the casing by the stop shoulders 13—13—13, as shown in Figure 6. After the shoes have been thus arrested in their movement inwardly of the casing, the springs D and E are relieved from further compression, the rubber element F only being compressed during the remainder of the actuating stroke of the mechanism, and until the parts reach the position shown in Figure 7. Figure 7 shows the positions of the parts when the usual front follower, not shown, engages the front end of the casing with the plunger moved inwardly of the casing to an extent to vertically align the front end of said plunger with the front end of the casing. As will be evident, during this last phase of the compression stroke of the mechanism, the shocks are absorbed solely by the rubber cushioning element, there being no further frictional resistance provided during this action because the shoes remain stationary within the casing.

Upon reduction of the actuating pressure on the plunger C, the expansive action of the springs D and E forces the shoes outwardly until arrested by the stop lugs 12—12—12 of the casing, and the action of the rubber cushioning element F in returning to its normal shape forces the plunger C outwardly until arrested by the flange 20 thereof coming in contact with the stop flanges 15—15—15 of the shoes B—B—B. The parts of the mechanism are thus restored to the normal full release position shown in Figure 1.

Although it is preferred that the amount of initial compression of the rubber element F is gaged so that there will be no appreciable additional lengthwise compression of the same until movement of the shoes B—B—B is arrested by the stops 13—13—13, it is in some cases desirable to provide simultaneous compression of the rubber element F with the springs D and E, during the entire or part of the compression of the mechanism, and this is accomplished by correspondingly reducing the amount of initial compression under which the element F is placed. In the latter case, there will be inward movement of the plunger with respect to the shoes B—B—B to compress the rubber element F either during a part of or the entire duration of inward movement of said shoes, depending upon the degree of initial compression under which the rubber element F is placed. Thus, when the amount of initial compression under which the element F is placed is made such as to be somewhat less than that hereinbefore mentioned as preferable, there will be some inward movement of the plunger C with respect to the shoes B—B—B to compress the element F as the shoes move inwardly and compress the springs D and E, and still further inward movement of said plunger to compress the element F after movement of the shoes is arrested by the stop shoulders 13—13—13 of the casing. As will be evident, further reduction in the amount of initial compression under which the rubber element is placed will produce a corresponding reduction of the amount of inward movement of the plunger with respect to the shoes after movement of the latter has been arrested, until a point is reached when there will be no further inward movement of the plunger after movement of the shoes has been arrested, and there is no further compression of the rubber element F.

I claim:

1. In a friction shock absorbing mechanism, the combination with a friction casing having interior friction surfaces at one end thereof; of friction shoes in engagement with said friction surfaces; transverse abutments on the rear ends of said shoes; yielding means within the casing reacting between the casing and the rear ends of said shoes for opposing inward movement of the latter; rubber means between said shoes, the inner end portion of said rubber means having shouldered engagement with said transverse abutments of said shoes; a pressure transmitting member movable lengthwise of the mechanism and engaging the front end of said rubber means for compressing the same lengthwise against said transverse abutments; and stop means within the casing engageable by said shoes for limiting movement of the latter inwardly of said casing.

2. In a friction shock absorbing mechanism, the combination with a friction casing having interior friction surfaces at one end thereof; of friction shoes in engagement with said friction surfaces; transverse abutments on the rear ends of said shoes; yielding means within the casing reacting between the casing and the rear ends of said shoes for opposing inward movement of the latter; rubber means between said shoes, the inner end portion of said rubber means having shouldered engagement with said transverse abutments of said shoes; a pressure transmitting member movable lengthwise of the mechanism and engaging the front end of said rubber means for compressing the same lengthwise against said transverse abutments, said rubber means being under initial compression between said pressure transmitting member and transverse abutments of said shoes; and stop means within the casing engageable by said shoes for limiting movement of the latter inwardly of said casing.

3. In a friction shock absorbing mechanism, the combination with a friction casing having interior friction surfaces at one end thereof; of friction shoes in engagement with said friction surfaces; transverse abutments on the rear ends of said shoes; yielding means within the casing reacting between the casing and the rear ends of said shoes for opposing inward movement of the latter; rubber means between said shoes, the inner end portion of said rubber means having shouldered engagement with said transverse abutments of said shoes; a pressure transmitting member movable lengthwise of the mechanism and engaging the front end of said rubber means for compressing the same lengthwise against said transverse abutments; and stop means within the casing engageable by said shoes for limiting movement of the latter inwardly of said casing, said rubber means being under a predetermined amount of initial compression between said pressure transmitting member and transverse abutments of said shoes, said predetermined compression of said rubber means being such that the latter acts as a solid column to transmit the load from said member to said shoes until the latter are arrested in their movement by said stop means.

4. In a friction shock absorbing mechanism, the combination with a friction casing having interior friction surfaces at one end thereof; of friction shoes in engagement with said friction surfaces; transverse abutments on the rear ends of said shoes; yielding means within the casing reacting between the casing and the rear ends of said shoes for opposing inward movement of the latter; rubber means between said shoes, the inner end portion of said rubber means having shouldered engagement with said transverse abutments of said shoes; a pressure transmitting member movable lengthwise of the mechanism and engaging the front end of said rubber means for compressing the same lengthwise against said transverse abutments; and stop means within the casing engageable by said shoes for limiting movement of the latter inwardly of said casing, said rubber means being under a predetermined amount of initial compressive force between said pressure transmitting member and transverse abutments of said shoes, said compressive force being at least as great as the compressive force to which the yielding means is subjected when the shoes have been forced to their innermost position against said stop means.

5. In a friction shock absorbing mechanism, the combination with a friction casing having interior friction surfaces at the front end thereof; of friction shoes in lengthwise sliding engagement with said friction surfaces; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said pressure transmitting plunger having shouldered engagement with said stops of said shoes for limiting outward movement of the plunger with respect to said shoes.

6. In a friction shock absorbing mechanism, the combination with a friction casing having interior friction surfaces at the front end thereof; of friction shoes in lengthwise sliding engagement with said friction surfaces; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said pressure transmitting plunger having shouldered engagement with said stops of said shoes for limiting outward movement of the plunger with respect to said shoes, said rubber means being under initial compression between said pressure transmitting plunger and transverse abutments of said shoes when the parts of the mechanism are in the full release position.

7. In a friction shock absorbing mechanism, the combination with a friction casing having interior friction surfaces at the front end thereof; of friction shoes in lengthwise sliding engagement with said friction surfaces; stop lugs on said casing inwardly of said surfaces; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said pressure transmitting plunger having shouldered engagement with said stops of said shoes for limiting outward movement of the plunger with respect to said shoes, said rubber means being under a predetermined amount of initial compression between said pressure transmitting plunger and transverse abutments of said shoes in the full release position of the parts, said predetermined compression of said rubber means being such that the latter acts as a solid column to transmit the load from said plunger to said shoes until the latter are arrested in their movement by said stop lugs.

8. In a friction shock absorbing mechanism, the combination with a friction casing having interior friction surfaces at the front end thereof; of friction shoes in lengthwise sliding engagement with said friction surfaces; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; interior stop means on said casing for said shoes; and a pressure transmitting plunger movable lengthwise of the mechanism and engaging the front end of said rubber means for compressing the same lengthwise against said abutments, said pressure transmitting plunger having shouldered engagement with said stops of said shoes for limiting outward movement of the plunger with respect to said shoes, said plunger, when limited in its outward movement with respect to said shoes by engagement with the stops of the latter, holding said rubber means compressed between said plunger and the transverse abutments of said shoes, the compressive force exerted on the rubber means under these conditions being at least as great as the compressive force to which the yielding means is subjected when the shoes have been forced to their innermost position against said stop means of the casing.

9. In a friction shock absorbing mechanism, the combination with a friction casing having interior friction surfaces at the front end thereof, said casing having interior stop shoulders at said front end; of friction shoes in lengthwise sliding engagement with said friction surfaces, said shoes having shoulders thereon engageable with said stop shoulders of the casing for limiting outward movement of the shoes with respect to the casing; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said plunger having shouldered engagement with said stops of said shoes for limiting outward movement of the plunger with respect to said shoes.

10. In a friction shock absorbing mechanism, the combination with a friction casing having interior friction surfaces at the front end thereof, said casing having interior stop shoulders at said front end; of friction shoes in lengthwise sliding engagement with said friction surfaces, said shoes having shoulders thereon engageable with said stop shoulders of the casing for limiting outward movement of the shoes with respect to the casing; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said plunger having shouldered engagement with said stops of said shoes for limiting outward movement of the plunger with respect to said shoes, said rubber means being under initial compression between said plunger and transverse abutments of said shoes when said plunger is in shouldered engagement with the stops of said shoes.

11. In a friction shock absorbing mechanism, the combination with a friction casing having interior friction surfaces at the front end thereof, said casing having stop lugs inwardly of the front end, said casing having interior stop shoulders at said front end; of friction shoes in lengthwise sliding engagement with said friction surfaces, said shoes having shoulders thereon engageable with said stop shoulders of the casing for limiting outward movement of the shoes with respect to the casing; transverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said plunger having shouldered engagement with said stops of said shoes for limiting outward movement of the plunger with respect to said shoes, said rubber means being under a predetermined amount of initial compression between said plunger and transverse abutments of said shoes when said plunger is in shouldered engagement with said stops of said shoes, said predetermined compression of said rubber means being such that the latter acts as a solid column to transmit the load from said plunger to said shoes until the latter are arrested in their movement by said stop lugs.

12. In a friction shock absorbing mechanism, the combination with a friction casing having interior friction surfaces at the front end thereof, said casing having interior stop shoulders and stop means at said front end; of friction shoes in lengthwise sliding engagement with said friction surfaces, said shoes having shoulders thereon engageable with said stop shoulders of the casing for limiting outward movement of the shoes with respect to the casing; tranverse abutments on the rear ends of said shoes; yielding means within the casing reacting between the casing and the rear ends of said shoes for opposing inward movement of the latter; stops on the front ends of said shoes; rubber means between said shoes, said rubber means bearing at its rear end on said transverse abutments of said shoes; and a pressure transmitting plunger movable lengthwise of the mechanism and engaging the front end of said rubber means for compressing the same lengthwise against said abutments, said plunger having shouldered engagement with said stops of said shoes for limiting outward movement of the plunger with respect to said shoes, said plunger, when limited in its outward movement with respect to said shoes by engagement with the stops of the latter, holding said rubber means compressed between said plunger and transverse abutments of said shoes, the compressive force exerted on the rubber means under these conditions being at least as great as the compressive force to which the yielding means is subjected when the shoes have been forced to their innermost positions against said stop means of the casing.

13. In a friction shock absorbing mechanism, the combination with a friction casing having interior friction surfaces at the front end thereof, said casing also having interior stop shoulders at the front end thereof; of friction shoes in lengthwise sliding engagement with said friction surfaces, said shoes having shoulders thereon engageable with said stop shoulders of the casing for limiting outward movement of the shoes with respect to the casing; transverse abutments on the rear ends of said shoes; yielding means within the casing reacting between said casing and the rear ends of said shoes for opposing inward movement of the latter; stops on the front ends of said shoes; cushioning means between said shoes, said cushioning means bearing at its rear end on said transverse abutments of said shoes; and a pressure transmitting plunger movable lengthwise of said mechanism and engaging the front end of said cushioning means for compressing the same against said abutments, said pressure transmitting plunger having shouldered engagement with said stops of said shoes for limiting outward movement of the plunger with respect to said shoes.

14. In a friction shock absorbing mechanism, the combination with a friction casing having interior friction surfaces at the front end thereof; of friction shoes in lengthwise sliding engagement with said friction surfaces and having transverse abutments at their rear ends; yielding means within the casing reacting between the casing and the rear ends of said shoes for opposing inward movement of the latter; stops on the front ends of said shoes; rubber cushioning means between said shoes, said rubber cushioning means bearing at its rear end on said transverse abutments of said shoes; a pressure transmitting plunger movable lengthwise of the mechanism and engaging the front end of said rubber cushioning means for compressing the same lengthwise against said abutments, said plunger having shouldered engagement with said stops of said shoes for limiting outward movement of the plunger with respect to said shoes; and stop means within the casing inwardly of the front end thereof, engageable by said shoes for limiting movement of the latter inwardly of the casing.

15. In a friction shock absorbing mechanism, the combination with a friction casing having interior friction surfaces at the front end thereof; of friction shoes in lengthwise sliding engagement with said friction surfaces and having transverse abutments at their rear ends; yielding means within the casing reacting between the casing and the rear ends of said shoes for opposing inward movement of the latter; stops on the front ends of said shoes; rubber cushioning means between said shoes, said rubber cushioning means bearing at its rear end on said transverse abutments of said shoes; a pressure transmitting plunger movable lengthwise of the mechanism and engaging the front end of said rubber cushioning means for compressing the same lengthwise against said abutments, said plunger having shouldered engagement with said stops of said shoes for limting outward movement of the plunger with respect to said shoes, and thereby holding said rubber means under initial compression between said plunger and transverse abutments of said shoes; and stop means within the casing inwardly of the front end thereof, engageable by said shoes for limiting movement of the latter inwardly of the casing.

16. In a friction shock absorbing mechanism, the combination with a friction casing having interior friction surfaces at the front end thereof; of friction shoes in lengthwise sliding engagement with said friction surfaces and having transverse abutments at their rear ends; yielding means within the casing reacting between the casing and the rear ends of said shoes for opposing inward movement of the latter; stops on the front ends of said shoes; rubber cushioning means between said shoes, said rubber cushioning means bearing at its rear end on said transverse abutments of said shoes; stop means within the casing inwardly of the front end thereof engageable by said shoes for limiting movement of the latter inwardly of the casing; and a pressure transmitting plunger movable lengthwise of the mechanism and engaging the front end of said rubber cushioning means for compressing the same lengthwise against said abutments, said plunger having shouldered engagement with said stops of said shoes for limiting outward movement of the plunger with respect to said shoes, and thereby holding said rubber cushioning means under initial compression between said plunger and transverse abutments of said shoes, said compression being such that the rubber cushioning means acts as a solid column to transmit the load from said plunger to said shoes until the latter are arrested in their movement by said stop means of the casing.

17. In a friction shock absorbing mechanism, the combination with a friction casing having interior friction surfaces at the front end thereof and limiting stop means interiorly of the same spaced inwardly from said front end; of friction shoes in lengthwise sliding engagement with said friction surfaces and having transverse abutments at their rear ends, said shoes being limited in their inward movement with respect to the casing by said limiting stop means; yielding means within the casing reacting between the casing and the rear ends of said shoes for opposing inward movement of the latter; stops on the front ends of said shoes; rubber cushioning means between said shoes, said rubber cushioning means bearing at its rear end on said transverse abutments of said shoes; a pressure transmitting plunger movable lengthwise of the mechanism and engaging the front end of said rubber cushioning means for compressing the same lengthwise against said abutments, said plunger having shouldered engagement with said stops of the shoes for limiting outward movement of the plunger with respect to the shoes and thereby holding said rubber cushioning means compressed between said plunger and transverse abutments of said shoes under a force at least as great as the force to which said yielding means is subjected when the shoes have been forced inwardly of the casing to the limit of their movement inwardly of said casing and against said limiting stop means of the casing.

18. In a friction shock absorbing mechanism, the combination with a friction casing having interior friction surfaces at the front end thereof, said casing also having interior stop shoulders at the front end thereof; of friction shoes in lengthwise sliding engagement with said friction surfaces, said shoes having shoulders thereon engageable with said stop shoulders of the casing for limiting outward movement of the shoes with respect to the casing; transverse abutments on the rear ends of said shoes; yielding means within the casing reacting between said casing and the rear ends of said shoes for opposing inward movement of the latter; stops on the front ends of said shoes; cushioning means between said shoes, said cushioning means bearing at its rear end on said transverse abutments of said shoes; a pressure transmitting plunger movable lengthwise of said mechanism and engaging the front end of said cushioning means for compressing the same against said abutments, said pressure transmitting plunger having shouldered engagement with said stops of said shoes for limiting outward movement of the plunger with respect to said shoes; and stop means within the casing spaced inwardly of said front stop shoulders, said stop means being engageable by said shoes for limiting movement of the latter inwardly of said casing.

19. In a friction shock absorbing mechanism, the combination with a friction casing having interior friction surfaces at one end thereof; of friction shoes in engagement with said friction surfaces; transverse abutments on the rear ends of said shoes; yielding means within the casing reacting between the casing and the rear ends of said shoes for opposing inward movement of the latter; rubber means between said shoes, said rubber means comprising a plurality of units arranged in series, each unit comprising a pair of spacing plates and an interposed rubber mat vulcanized to said plates, the inner end portion of said rubber means having shouldered engagement with said transverse abutments of said shoes; a pressure transmitting member movable lengthwise of the mechanism and engaging the front end of said rubber means for compressing the same lengthwise against said transverse abutments; and stop means within the casing engageable by said shoes for limiting movement of the latter inwardly of said casing.

No references cited.